United States Patent [19]

Bertagne

[11] Patent Number: 4,904,862

[45] Date of Patent: Feb. 27, 1990

[54] LENS ADJUSTMENT FOR A LIGHT EMITTING DIODE PRINT HEAD

[75] Inventor: Michael G. Bertagne, San Jose, Calif.

[73] Assignee: Hewlett-Packard Company, Palo Alto, Calif.

[21] Appl. No.: 299,999

[22] Filed: Jan. 19, 1989

[51] Int. Cl.[4] ........................ H01J 3/14; G01D 15/06

[52] U.S. Cl. ...................................... 250/216; 346/155

[58] Field of Search .............. 250/216, 552; 346/76 L, 346/155, 160

[56] References Cited

U.S. PATENT DOCUMENTS 4,424,524 1/1984 Daniele ............................... 346/160
4,703,334 10/1987 Mochimaru ......................... 346/155

*Primary Examiner*—David C. Nelms
*Assistant Examiner*—Sherrie Hsia
*Attorney, Agent, or Firm*—Douglas A. Kundrat

[57] ABSTRACT

A print head for a light emitting diode printer has a row of LEDs on a mother plate and an end mounting plate secured at each end of the mother plate. A linear lens array is positioned over the LEDs. The optical elements of the print head are adjusted by mounting these components in a fixture having an optical image analyzer for analyzing the quality of image from an individual LED projected onto the face of the analyzer. The total conjugate or spacing between the row of LEDs and the image analyzer is adjusted for maximizing image quality. One end of the lens array between the LEDs and analyzer is adjusted for maximizing the quality of an image of an LED on the optical analyzer. The spacing of the second end of the lens array is then adjusted for maximizing the quality of an image of an LED near the other end of the row. The adjustment steps may be repeated for optimizing the LED images. After adjustment, the position of the lens array is locked in the end mounting plates. A bearing reference surface on each end plate is locked against a reference surface on the analyzer. When the print head is mounted in a printer, the reference surfaces on the end mounting plates serve to position the print head with the LED images focused on the photoreceptive surface of the printer.

13 Claims, 3 Drawing Sheets

LENS ADJUSTMENT FOR A LIGHT EMITTING DIODE PRINT HEAD

BACKGROUND

It has become desirable to employ xerographic non-impact printers for text and graphics. An electrostatic charge is developed on the photoreceptive surface of a moving drum or belt and selected areas of the surface are discharged by exposure to light. A printing toner is applied to the drum and adheres to the areas having an electrostatic charge and does not adhere to the discharged areas. The toner is then transferred to a sheet of plain paper and is heat-fused to the paper. By controlling the areas illuminated and the areas not illuminated, characters, lines and other images may be produced on the paper.

One type of non-impact printer employs an array of light emitting diodes (commonly referred to herein as LEDs) for exposing the photoreceptor surface. A row, or two closely spaced rows, of minute LEDs are positioned near a lens so that their images are arrayed across the surface to be illuminated. The LEDs along the line are selectively activated to either emit light or not as the surface moves past, thereby exposing or not exposing the photoreceptive surface in a pattern corresponding to the LEDs activated.

To obtain good resolution and image quality in such a printer, the physical dimensions of the LEDs must be quite small and very tight position tolerances must be maintained. One part of this concern is the spacing of the row of LEDs from the photoreceptive surface and the location of the lens therebetween to get a sharp image of the LEDs on the surface.

It has previously been the practice to simply assemble the row of LEDs with precision and build mounting structures that place the LEDs, lens, and photoreceptive surface at the best position obtainable by ordinary precision manufacturing techniques. There may, however, be variations in the mechanical dimensions of parts and differences in the optical properties of the lenses which result in the image on the photoreceptive surface being less than optimum.

It is, therefore, desirable to provide a technique for adjusting the optical elements of the print head for obtaining optimum image quality. The technique should be one that can be at least partly automated for use on an assembly line without requiring extensive judgment on the part of the operator and which does not require the making of test prints with an assembled printer. This latter is significant since the adjustments are preferably made on the print head independently of the balance of the printer.

BRIEF SUMMARY OF THE INVENTION

There is, therefore, provided in practice of this invention according to a presently preferred embodiment, an adjustable mounting for a light emitting diode print head. A number of LEDs are mounted in a row on a plate which has an end mounting plate at each end. Each of the end mounting plates comprises means for adjustably fixing one end of a lens array at a selected distance from the LEDs and a bearing reference surface which can be adjustably fixed at a selected distance from the row of LEDs. These optical elements are adjusted using light emitted from the LEDs in the row, transmitted through the lens array to an image quality analyzer. The distance between the LEDs and the analyzer is adjusted for maximizing the image quality. The location of each end of the lens array is then independently adjusted in the gap between the analyzer and the LEDs for maximizing the image quality. Preferably, the steps are performed at the ends of the array and may be repeated for optimum adjustment.

BRIEF DESCRIPTION OF THE DRAWINGS

These and other features and advantages of the present invention will be appreciated as the same becomes better understood by reference to the following detailed description when considered in connection with the accompanying drawings wherein.

DETAILED DESCRIPTION

Figure 1:
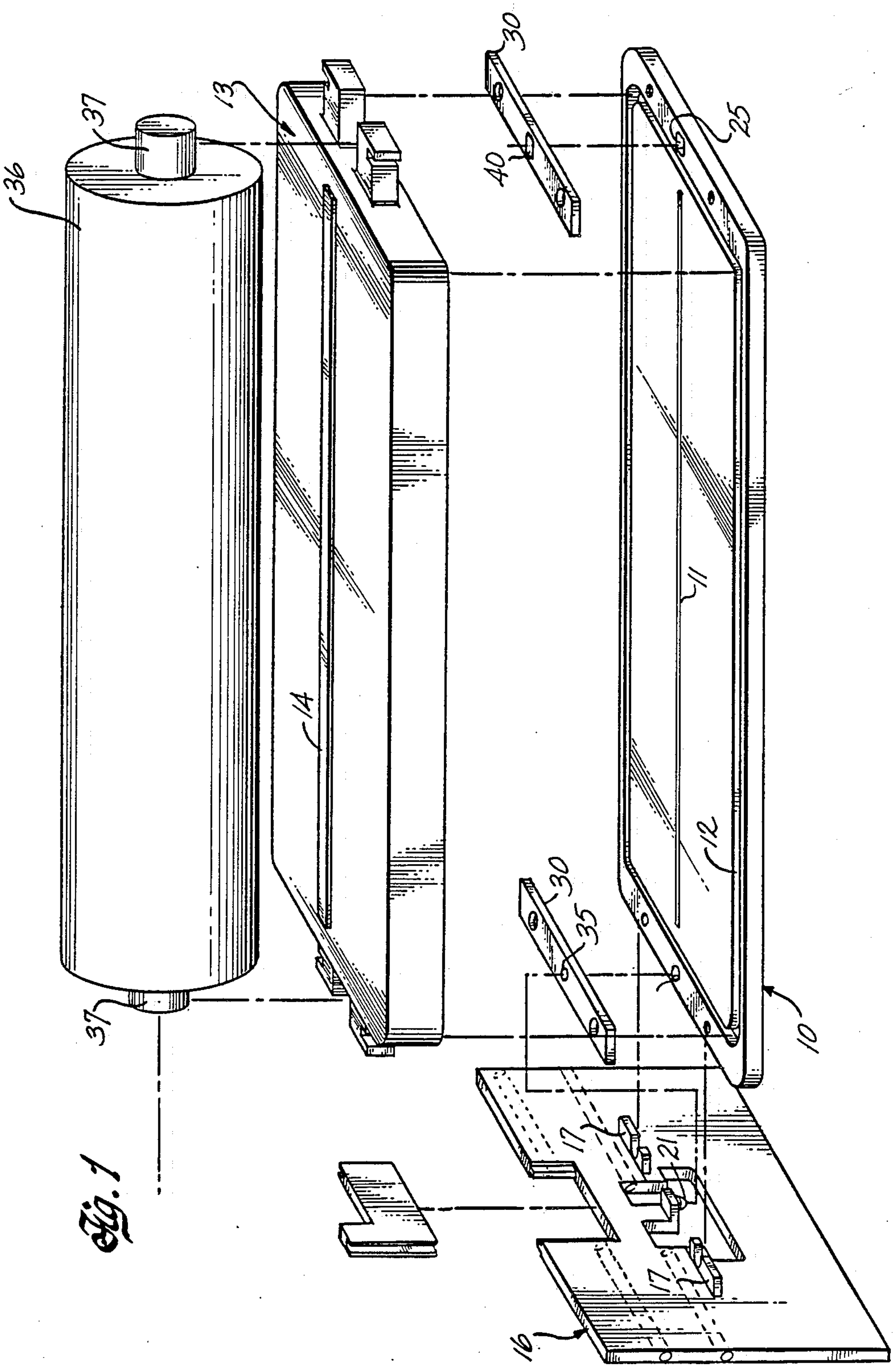
FIG. 1 is an exploded, somewhat schematic view of parts of an adjustable print head assembly.

The foundation for the assembly of LEDs of a print head is a flat mother plate 10 illustrated in FIG. 1 with just enough detail for an understanding of this invention. A row of LED dice 11, each having a row of LEDs thereon, is mounted on the front face of the mother plate. This row is made straight and flat, parallel to the face of the mother plate. Additional details of the LED mounting are omitted.

Figure 6:
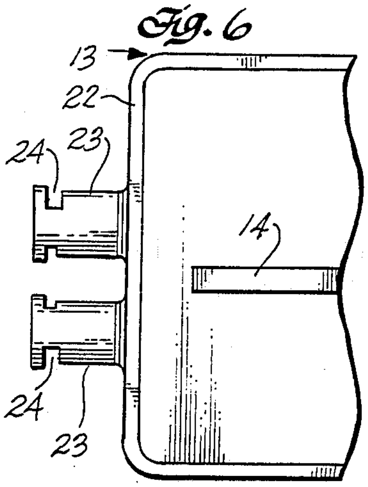
FIG. 6 is a fragmentary detail of the inside of one end of an exemplary cover of the print head.

The front face of the mother plate has a peripheral groove 12, which receives a rim 22 (FIG. 6) around the edge of a hollow, rectangular cover 13. A long array of lenses 14 extends along the cover in a location that overlays the row of LEDs. An exemplary lens array comprises a "Selfoc" lens array available from Nippon Sheet Glass Co. Ltd., Tokyo, Japan. Such a lens array comprises an array of glass cylinders each having a graded index of refraction to act as a projection lens. Collectively, these lenses are used for projecting a row of images of individual LEDs on the photoreceptive surface of a printer. The lens per se does not form a part of this invention and is a standard commercial product.

Reference blocks 30 are attached to each end of the mother plate providing at least one distinct reference to the LEDs. The center-line of the middle hole 35 of the "right" reference block 30 and the center-line of the middle slot 40 of the "left" reference block 30 are precisely aligned to accurately indicate the center-line of the LEDs in the direction transverse to the row of LEDs in the plane of the mother plate. The reference blocks are assembled on the mother plate at the same time that the LED assemblies are attached. The LED assemblies and reference blocks are cemented to the mother plate by an epoxy adhesive. The top surface of each reference block is in the same plane as the LEDs.

An end mounting plate 16 is mounted on the flat, top surface of each reference block and fastened to each end of the mother plate normal to the end of the mother plate. One of these end mounting plates is indicated schematically in FIG. 1, and it will be understood that a similar plate, which is a mirror image of the first one, is provided at the opposite end of the assembly. A pair of mounting tabs 17 protruding from the inner face of the end mounting plate provide a means for bolting or otherwise securing the end mounting plate onto the mother plate. A post 18 (better seen in FIG. 2) and alignment tab 19 support an alignment pin 21 for inserting into the middle hole 35 of the "right" reference block or the slot 40 of the "left" reference block at the ends of the mother plate for proper positioning of the end mounting plates with respect to the LEDs on the mother plate. The lower faces of the mounting tabs and alignment tab engage the top surface of the reference block for securing it in a predetermined position. Other structural arrangements for connecting the end mounting plates perpendicular to the row of LEDs on the mother plate will be apparent.

Figure 3:
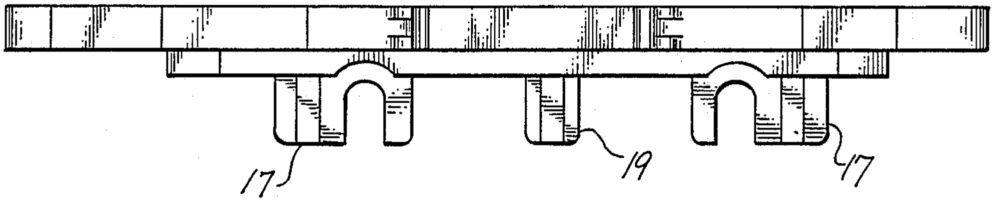
FIG. 3 is an end view of one edge of the end plate of FIG. 2.
Figure 2:
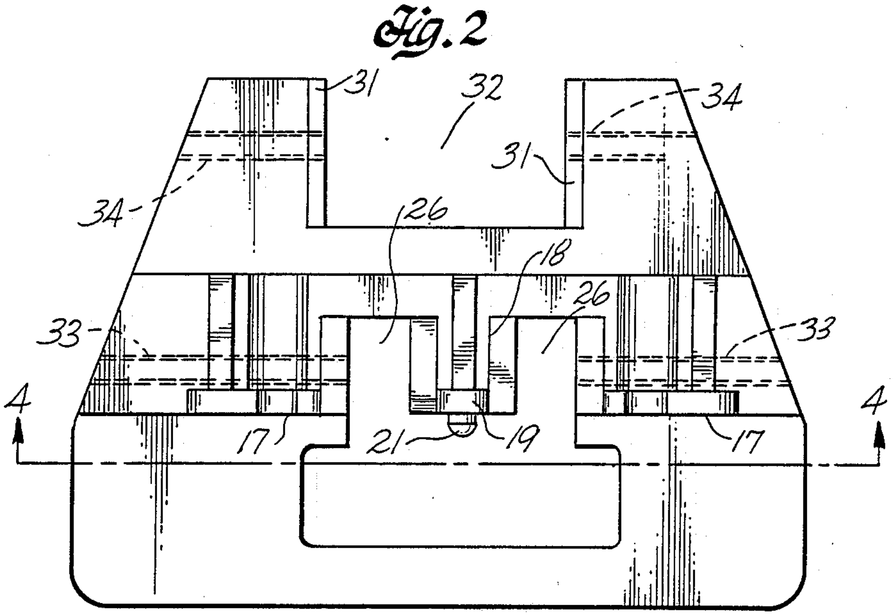
FIG. 2 is a face view of one end plate of such an assembly.
Figure 4:
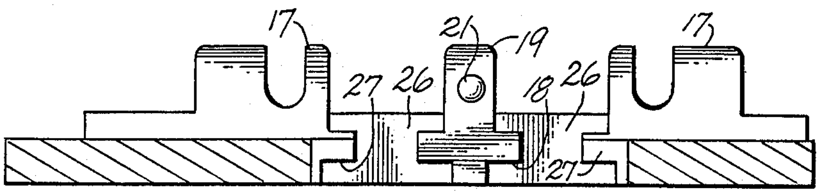
FIG. 4 is a cross-section of the end plate along line 4—4 of FIG. 2.

An exemplary end plate is illustrated in FIGS. 2 to 4 with some details omitted that are not needed for an understanding of this invention. The rather complex perimeter of the end plate as seen in FIG. 2 is largely irrelevant and simply represents some of the structure for mounting the print head in a particular embodiment of printer. It should be apparent that some such collateral structure is omitted from the drawings for clarity. For example, a number of holes may be provided through the end plate for reducing its weight.

The opaque cover of the print head assembly has a peripheral rim 22 on its underside which fits loosely into the groove 12 in the mother plate. A slot along the center of the cover accommodates the array of lenses 14. A pair of spaced apart ears 23 extend from each end of the cover, and each ear has an outwardly facing groove 24. Assembled in the print head, the ears fit into slots 26 straddling the post 18. At the inner and outer edges of each slot, there is a longitudinally extending tongue 27 which fits into the grooves in the respective ears. This tongue and groove engagement at each end of the cover keeps it in position and permits movement perpendicular to the plane of the mother plate.

Figure 5:
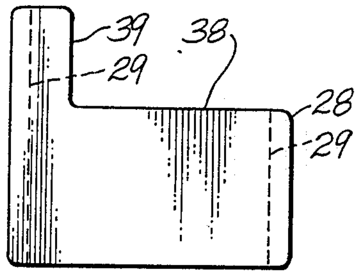
FIG. 5 illustrates a slide having a bearing reference surface for assembly on such an end plate.

An L-shaped slide 28 (FIG. 5) has a groove 29 along each edge for engaging a tongue 31 along an adjustment slot 32 in an edge of the end plate. The tongue and groove engagement along opposite edges of the slide serve as guides to permit its adjustment in a direction perpendicular to the plane of the mother plate on which the LEDs are mounted.

Tapped holes 33, 34 extend from edges of the end plate for receiving set screws (not shown). One pair of tapped holes leads to the slots 26 which receive the ears on the ends of the cover. The other pair of tapped holes leads to the slot 32 within which the L-shaped slide is guided.

Thus, in summary, a pair of end mounting plates are bolted to the ends of the mother plate on which a row of LEDs is assembled. A cover fits loosely in the groove 12 around the mother plate and has ears which fit into parallel slots in the end plates. A lens array extends along the cover over the LEDs.

Such a print head assembly is positioned in the printer next to a drum 36 which may have a photoreceptive surface, or around which a belt having a photoreceptive surface moves. For good image quality, it is important that the print head be properly positioned with respect to the photoreceptive surface and that the lens array be properly positioned therebetween. The greatest criticality is the spacing between these parts.

Precise positioning is also required to properly align and fixture the print head assembly in the direction transverse to the row of LEDs in the plane of the mother plate with respect to the photoreceptor surface and with the lens array properly positioned therebetween. This positioning is accomplished by properly inserting the alignment pin 21 of the end mounting plates into the respective hole 35 and slot 40 of the reference blocks. Since the center-line of the middle hole in each reference block coincides with the center-line of the row of LEDs, as previously described, the properly installed end mounting plates now contain the precise means for referring to the row of LEDs. The bearing reference surface 31 of an end mounting plate is precisely located to the alignment pin in the manufacturing process. The L-shaped slide 28 also contains a bearing reference surface 29 which remains in intimate contact with the bearing reference surface 31. Finally, the side bearing reference surface 39 on the re-entrant portion of the L-shaped slide is precisely located to the bearing reference surface 29 in the manufacturing process, thereby ensuring that the bearing reference surface 39 is properly positioned with respect to the center-line of the LEDs in the transverse direction in the plane of the mother plate and, consequently, that the print head assembly is properly aligned with respect to the photoreceptor surface with the lens array properly positioned therebetween.

There is less criticality on image quality of positioning in the direction of the length of the row of LEDs. This position is readily maintained with adequate precision by careful attention to normal manufacturing tolerances. It is, however, desirable to provide adjustment for the spacing between the LEDs, lens array, and drum.

When positioned in a printer, the print head assembly is located with respect to the drum by engagement of annular surfaces on the hubs 37 of the drum with the top bearing reference surface 38 and side bearing reference surface 39 on the re-entrant portion of the L-shaped slide 28. Adjustment of the slide along the length of the slot 32 in the end plate fixes the distance between the LEDs and drum. Adjustment of the ears on the cover 13 in the slots 26 in each end plate fixes the position of the lens array in the gap between the LEDs and drum. In each case, the cover and slide are locked in their adjusted position by set screws in the tapped holes 33 and 34, respectively.

Figure 7:
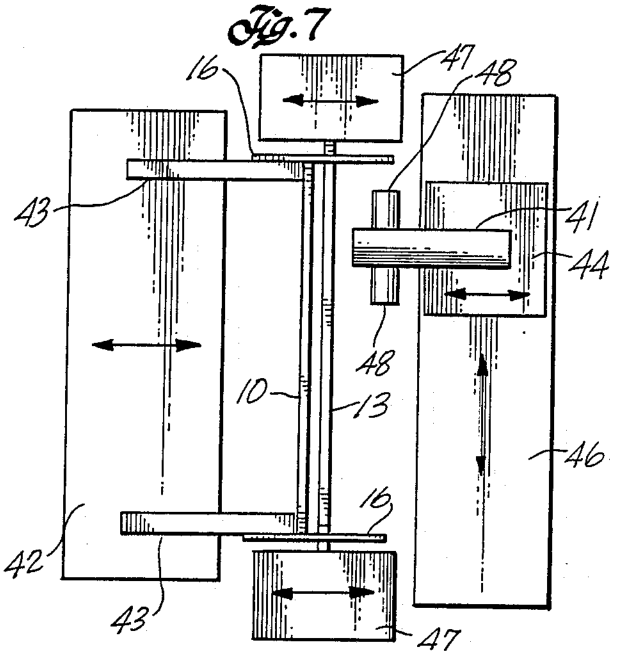
FIG. 7 is a schematic top view of a lens adjusting fixture.
Figure 8:
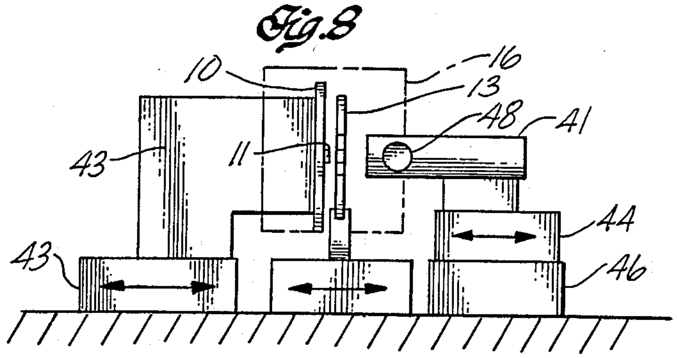
FIG. 8 is a side view of the lens adjusting fixture.

A fixturing apparatus for adjustment of the print head assembly is illustrated schematically in top and side views, respectively, in FIGS. 7 and 8. Since it is an assembly fixture, the fixturing apparatus is carefully built and assembled with considerable precision. In this way a single apparatus is built with high precision, and the print heads can be built with acceptable tolerances and then adjusted for best optical quality.

In these drawings, the mother plate 10 and cover 13 are indicated schematically as if spaced apart from each other. They are also illustrated spaced apart from a photodetector head 41 of an image quality analyzer. This is deliberately exaggerated for clarity in the drawing. The end plates 16 are illustrated schematically and shown only in phantom in FIG. 8.

The mother plate and end plates of the print head assembly are fastened securely together and fixtured onto a first linear translation stage 42 by brackets 43.

The linear translation stage can move precisely in a direction perpendicular to the plane of the mother plate, as indicated by the double-ended arrow in the drawings. The photodetector head is mounted on a second linear translation stage 44 which is, in turn, mounted on a third linear translation stage 46. The second stage on which the analyzer head is mounted can be translated precisely perpendicular to the plane of the mother plate. The third stage 46, permits translation of the second stage in a direction parallel to the length of the mother plate.

The cover 13 which has the lens array therein, has each end secured to a separate end linear translation stage 47. These translation stages are moveable independently of each other in a direction perpendicular to the plane of the mother plate.

The image quality analyzer is an electronic instrument which can determine the modulation transfer function (MTF) of an optical image. A suitable MTF analyzer is available from Ealing Electro-Optics, PLC, Watford, England. It is an optical equivalent of an electronic spectrum analyzer. Such an instrument is used to assess the quality or sharpness of focus of a single, lighted LED's image in absolute terms. For reliable quality assurance, it is desirable to measure the performance of the print head optical system numerically rather than by a printing trial which may be influenced by other factors.

A print head assembly is adjusted after fixing the mother plate, with its attached end plates, rigidly on the first linear translation stage 42. The cover is loose in the slots in the end plates and fixtured securely to the two end translation stages 47. The L-shaped slides (not separately shown in FIGS. 7 and 8) are also loose.

The adjustment process begins by mounting the cover and photodetector head 41 of the MTF analyzer into approximately their final correct positions by way of the end stages 47 and the second linear translation stage 44.

Light emitted by an LED near the end of the row passes through the lens array and is focused on the photodetector head. The first and second translation stages 42 and 44 are then used to move the mother plate and photodetector toward or away from each other for maximizing the quality of the LED image detected by the image quality analyzer. Either the mother plate or the photodetector head may be moved, or both may be moved. It is generally found in practice that this initial adjustment is best made by moving both. This adjustment of the total conjugate of the optical system between the LED and photodetector may be performed at any place along the length of the row of LEDs. This is feasible since the mother plate is mounted perpendicular to the translation direction of the first stage with considerable precision. Typically, this adjustment may be made with the photodetector head near one end of the lens array.

Next, with the photodetector head near one end of the lens array, that end of the cover is moved by way of one of the end stages 47. The lens array is moved by way of moving the cover for maximizing the quality of the image of an LED near the end of the array. The photodetector head is then moved to the other end of the lens array for analyzing the image of an LED near that end of the array. The second end of the lens array is moved by the second end translation stage for maximizing the image quality.

Preferably, the adjustment is then checked and further refined by returning the photodetector head to the first end of the array and adjusting its position and the position of the end of the cover for optimizing image quality. The lens array and analyzer head adjustments may be repeated at the opposite ends of the array as often as desired for optimizing image quality.

Once a desired image quality is obtained in the print head, the set screws in the threaded holes 33 are tightened and/or an instant structural adhesive is applied along the mating surfaces for locking the two ears on the cover in the adjusted position. The L-shaped slide at that end of the assembly is then moved so that the surfaces 38 and 39 on the slide are against a dowel 48 extending laterally from the photodetector head. Once in proper engagement with the dowel, the L-shaped slide is also locked in place by set screws or instant adhesive in the threaded holes 34.

The analyzer head is then returned to the second end of the assembly, where the end of the lens cover and the L-slide are locked in position by set screws or instant adhesive. It is then desirable to traverse the photodetector head to the middle part of the lens array to verify that an image in this portion of the print head is also optimized. If it is, the adjustment of the print head assembly is complete.

After the set screws are locked against the ears on the cover and the L-shaped slides, and the image quality has been verified, it is desirable to completely cement the set screws in position to prevent loosening and loss of adjustment.

The dowel 48 extending out each side of the analyzer head is precisely positioned with respect to the image plane of the photodetector, in the same relationship the photoreceptive surface has to the hubs 37 on the printer drum. When the print head assembly is placed in the printer, the bearing reference surfaces 38 and 39 of the L-shaped slide are placed against annular surfaces of the hubs thereby assuring that the image on the photoreceptive surface is the same as the image projected on the photodetector head.

In the initial stages of adjustment, it is desirable to maximize the image quality by adjusting the positions of the mother plate, analyzer, and lens. This is generally true in the final adjustment stage as well. It may occur, however, that there are irregularities in the lens array or LEDs which are best accommodated by having some or all of the LEDs ever so slightly out of focus so that all of them are within optical specifications. Otherwise, it might happen that the image quality is maximized for some of the LEDs, but aberrations make some of the LED images fall outside the optical specifications.

The adjustment technique can be performed by manually controlling the motion of the linear translation stages and observing the image quality by way of the MTF analyzer. The adjustment may also be automated to some extent by using a computer program for moving the designated fixtures, searching for the maximum image quality, and returning the fixture to the optimum position.

It is desirable to use an image quality analyzer so that operator discretion and errors are largely precluded. The MTF analyzer measures the image quality in absolute terms. Thus, the performance of the print head and lens combination can be assessed numerically rather than by a printing trial, which may be influenced by other factors, thereby improving total print head quality.

This adjustment technique is also desirable since the print head is adjusted using the actual light sources (the LEDs) imaged when the print head is assembled in the printer. This leads to a better image quality than feasible with a separate reference light source. Further, adjusting the lens while it is mounted on the print head rather than an external test fixture, leads to better image quality through elimination of any accumulated extraneous tolerances associated with an additional external test fixture.

The mounting arrangement for the print head and the test fixturing allow adjustments to be made in only two places at each end of the assembly. Excellent image quality can be obtained across the entire print head rapidly. Further, all optical adjustments are made in a single test fixture, and the print head and lens combination become a single, fixed assembly which can be easily placed in use in the printer, making final assembly easier, quicker, more reliable, and independent of mounting in a particular printer.

Although limited embodiments of LED print head adjustment have been described and illustrated herein, it will be understood that many modifications and variations are possible. For example, other fixturing setups can be used which would permit independent adjustments of the mother plate, bearing reference surfaces on the end plates, and lens cover. Clearly, other structural arrangements of the print head can be provided for fitting into specific printers. Other ways of connecting the end plates, mother plate, and lens array may be involved. Thus, within the scope of the appended claims the invention may be practiced otherwise than as specifically described.

What is claimed is:

1. A method for adjusting a light emitting diode print head comprising a row of LEDs on a mother plate, an elongated lens array approximately parallel to the row of LEDs, and a reference surface at each end of the mother plate for mounting the print head at a fixed location in a printer, comprising the steps of:

passing light from the LEDs through the lens array;

sensing LED light from the lens array with an image quality analyzer;

adjusting the distance between the LEDs and the analyzer for maximizing image quality;

adjusting the location of one end of the lens array in the gap between the analyzer and the LEDs for maximizing image quality at that end of the array;

adjusting the location of the other end of the lens array in the gap between the analyzer and the LEDs for maximizing image quality at that end of the array;

fixing the lens array in the adjusted position; and fixing the reference surfaces at known locations relative to the analyzer.

2. A method as recited in claim 1 comprising repeating the adjusting steps sequentially for optimizing image quality.

3. A method as recited in claim 1 wherein the steps of adjusting the locations of the ends of the lens array comprises adjusting the ends of the lens array in a direction normal to the length and width of the row of LEDs.

4. A method as recited in claim 1 wherein the step of fixing the reference surfaces comprises adjusting each reference surface in a direction normal to the length and width of the row of LEDs and locking the reference surfaces in their adjusted positions.

5. A method as recited in claim 1 comprising adjusting the locations of the ends of the lens array in the gap between the image quality analyzer and the LEDs independently at each end of the row of LEDs.

6. A method for adjusting a light emitting diode print head comprising a row of LEDs, an elongated lens array for focusing the images of the LEDs on an image plane, and a reference surface at each end of the row of LEDs for mounting the print head in a printer at a known location, comprising the steps of:

emitting light from at least one LED near each end of the row;

passing the light through an end of the lens array;

analyzing the image of the light from one such LED with an image quality analyzer;

adjusting the total conjugate of such an LED and the analyzer for maximizing image quality;

adjusting the position of a first end of the lens array in the gap between the LEDs and the analyzer for maximizing image quality; and adjusting the position of the second end of the lens array in the gap between the LEDs and the analyzer for maximizing image quality.

7. A method as recited in claim 6 wherein the total conjugate is adjusted before the lens array position is adjusted.

8. A method as recited in claim 6 comprising repeating the adjusting steps sequentially for optimizing image quality.

9. A method as recited in claim 6 comprising adjusting locations of the ends of the lens array in the gap between the image quality analyzer and the LEDs independently at each end of the row of LEDs.

10. A method for adjusting the optical elements of a light emitting diode print head comprising the steps of:

adjusting the spacing between a row of LEDs and an image quality analyzer for maximizing quality of an image of an LED on the optical analyzer;

adjusting the spacing of a first end of a lens array between the LEDs and the analyzer for maximizing quality of an image of an LED on the optical analyzer; and adjusting the spacing of a second end of the lens array between the LEDs and the analyzer for maximizing quality of an image of an LED on the optical analyzer;

locking the spacing of the ends of the lens array in position; and locking a reference surface on the print head in a position determined by the spacing between the LEDs and the image quality analyzer.

11. A method as recited in claim 10 comprising repeating the adjusting steps sequentially for optimizing image quality.

12. A method as recited in claim 10 comprising adjusting the locations of the ends of the lens array in the gap between the image quality analyzer and the LEDs independently at each end of the row of LEDs.

13. An adjustment fixture for a light emitting diode print head comprising:

means for securing a plate having a row of LEDs thereon in a selected position in the fixture;

image analyzer means for analyzing the quality of an image of an individual LED on the plate;

means for moving the analyzer in a direction parallel to the row of LEDs;

means for moving the analyzer in a direction perpendicular to the row of LEDs;

means for independently moving each end of a linear lens array between the row of LEDs and the analyzer in a direction perpendicular to the row of LEDs; and reference means on the analyzer for engaging a reference surface on the print head at a selected location.

* * * * *